June 24, 1924.
P. V. POWELL
1,499,123
VARIABLE SPEED POWER TRANSMISSION CONTROL
Filed July 16, 1920    4 Sheets-Sheet 4
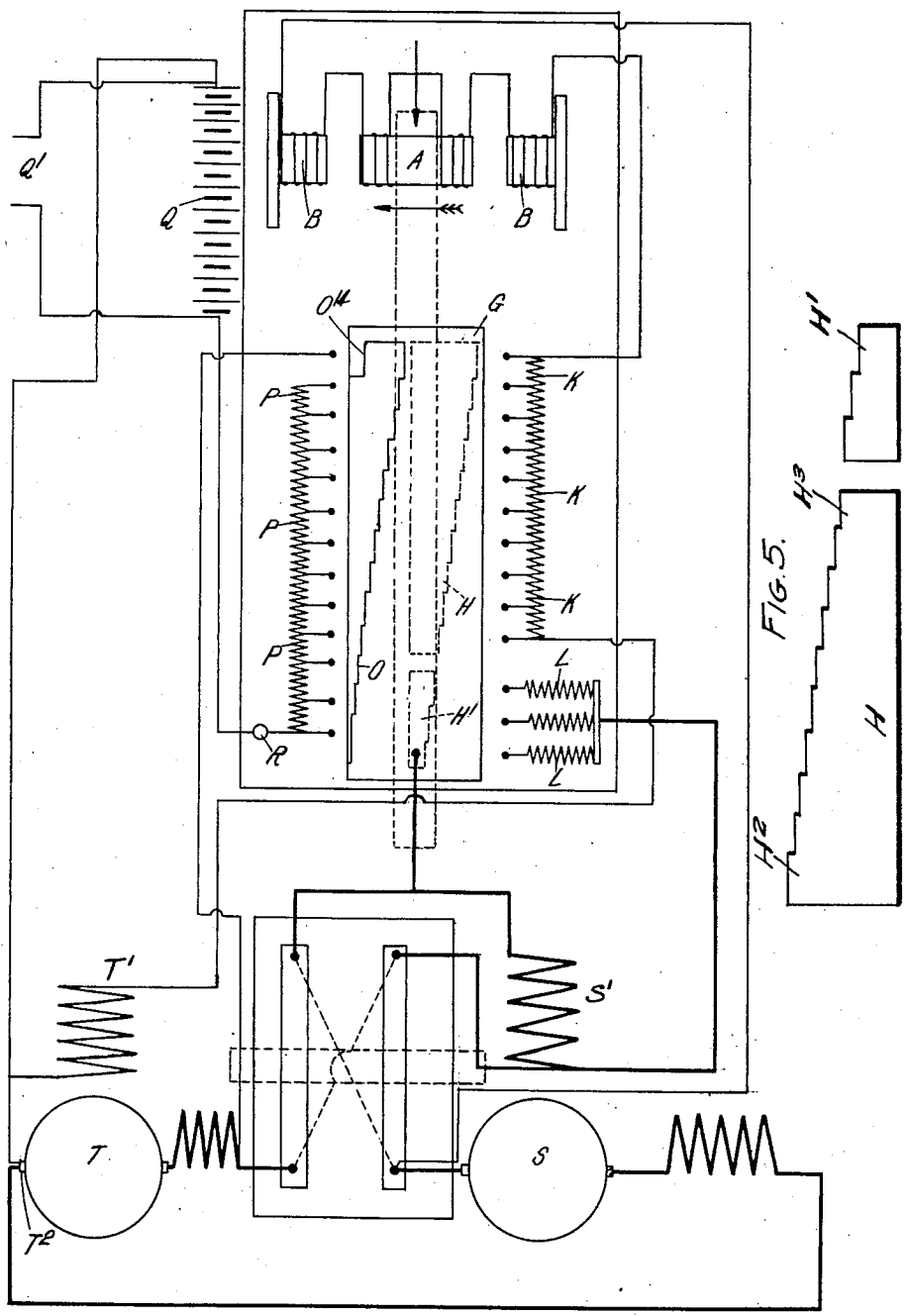
INVENTOR
Philip Victor Powell
By Nicolaus Nicolausen Patented June 24, 1924.

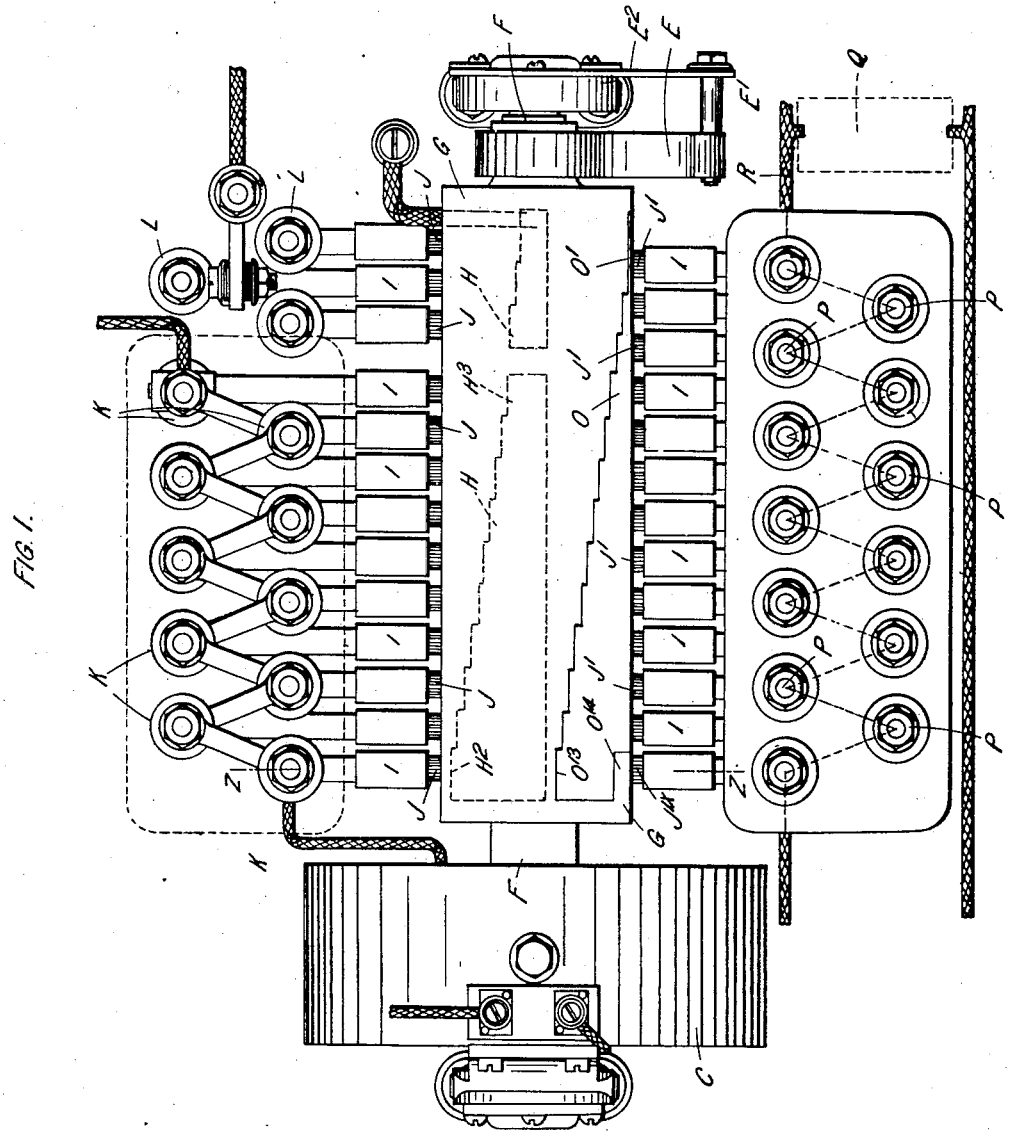

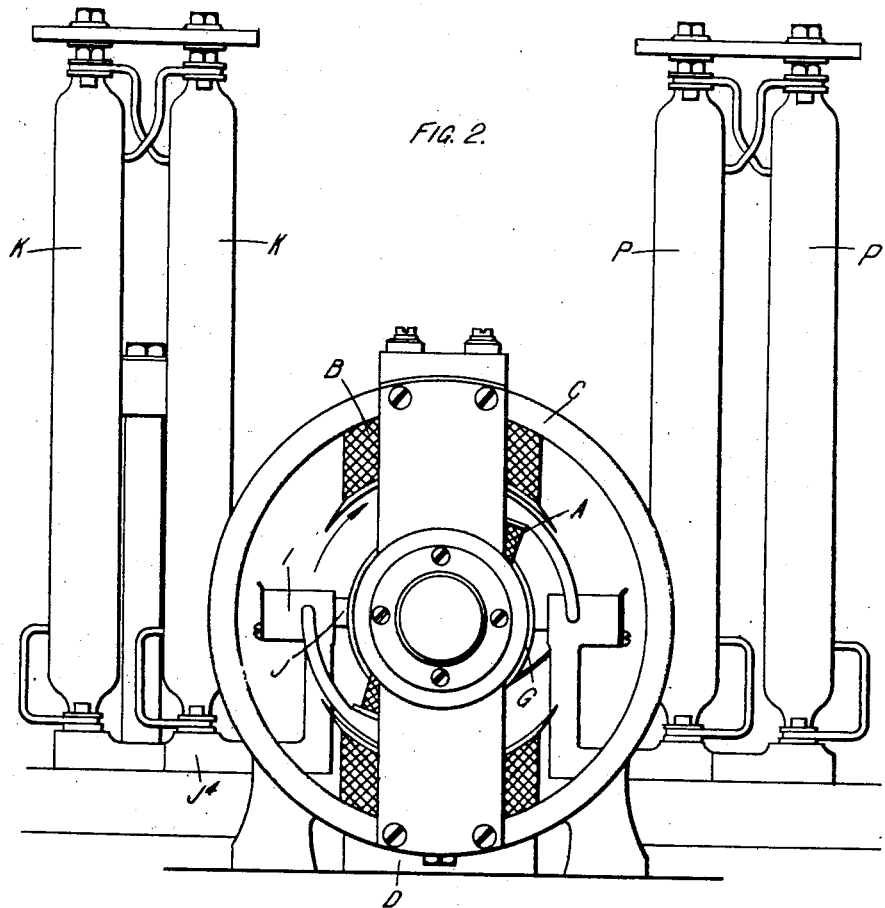
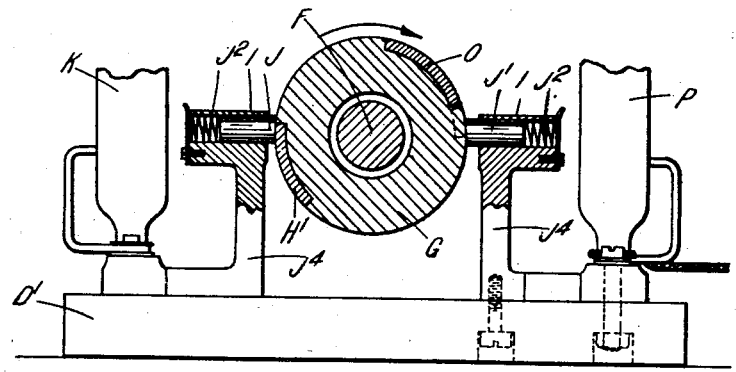

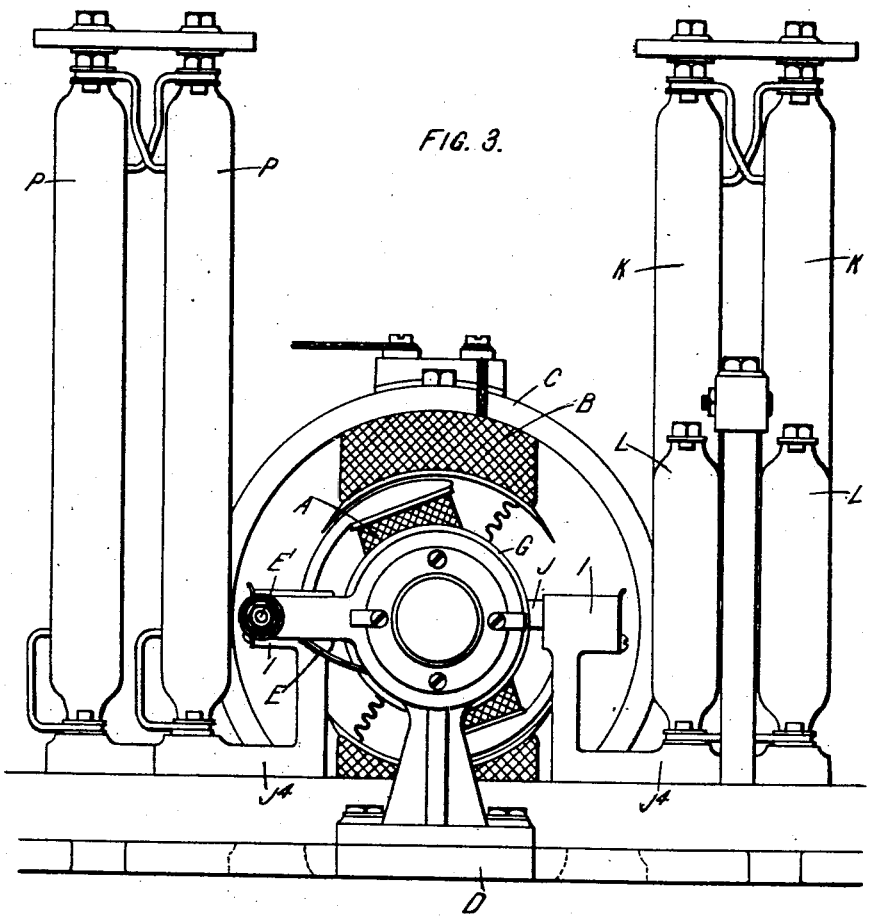
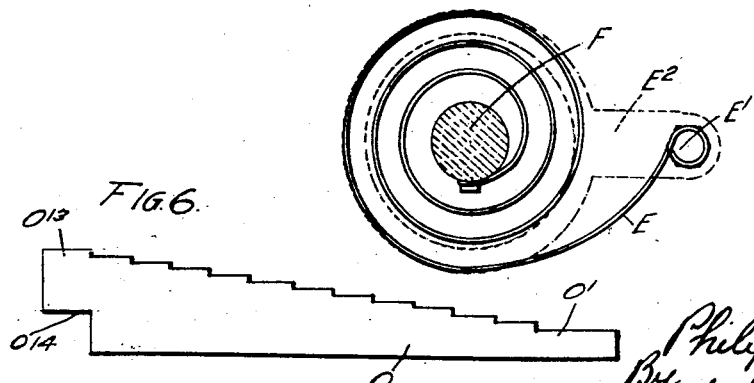

1,499,123

UNITED STATES PATENT OFFICE.

PHILLIP VICTOR POWELL, OF KENT, ENGLAND.

VARIABLE-SPEED POWER-TRANSMISSION CONTROL.

Application filed July 16, 1920. Serial No. 396,800.

*To all whom it may concern:*

Be it known that I, PHILLIP VICTOR POWELL, a subject of the King of Great Britain, and a resident of Kent, England, have invented an Improved Variable-Speed Power-Transmission Control, of which the following is the specification.

The object of my invention is to provide a new method of and means for effecting electric control automatically of the electric energy employed for transmission purposes upon motor vehicles, and especially upon that type of electric transmission vehicle known as the petrol electric, the invention of my new apparatus being to effect a control so completely automatic of the whole of the electric transmission apparatus, both for forward and for reverse speeds, that the regulation and operation of the vehicle is effected solely by controlling the speed or power of the internal combustion or other prime mover, as for example, by varying the throttle valve in the engine, or otherwise by the direct regulation by the driver or operator of the speed and power of the engine.

The invention is particularly applicable to and is described as applied to vehicles having the electric transmission known as petrol electric vehicles in which one or more electric motor is employed transmitting the power received from the generator which is directly coupled to the prime mover, to a differential gear or the like upon the back axle.

A further object of my invention is to effect an automatic regulation or control of the charging of the lighting battery on the vehicle by the same automatic apparatus or device as that before referred to, which effects the control of the transmission energy of the vehicle. The apparatus for effecting a like automatic control for the lighting battery or other electric apparatus that may be employed upon the vehicle, serves at the same time and by the same automatic method and means to reduce the pressure of the electrical energy, a step down being effected from the voltage necessary for transmission purposes to that for lighting purposes, for example, from 200 to 12 volts.

The apparatus according to this invention may also be employed separately on the vehicle for effecting control of the electric energy as employed for electric welding.

Broadly expressed my new method consists in interposing in the main circuit an electro-responsive device comprising an armature mounted upon a spindle in bearings and adapted to rotatively oscillate in a magnetic field. The armature is connected in series with the magnetic field coils, and the complete device is preferably connected across the outer terminals of the generator of the petrol electric vehicle. The oscillating armature moves electrically against the action of a spring, which spring serves to bring the armature back to its normal position, and means for adjustment are provided so that this position of rest can be adapted to suit the varying conditions under which the device is required to work. The armature is connected to a cylindrical drum of insulating material. On the peripheral surface of the drum is embedded a metallic segment or segments so arranged in steps as to make contact with a row of contact fingers arranged in parallel relation on the side of the drum, the segments being so cut that each finger makes contact in turn or succession as the drum is oscillated by the armature.

The contact fingers are mounted on suitable angle brackets supported on a base of insulating material, each of which carries a coil of resistance wire in a separate casing or cover as a unit. The number of resistance units and angle brackets may be altered as desired to enable the controller to suit any type or size of machine. Certain of these resistance units are connected in series with the generator shunt field and others in parallel with the electric motor field. The resistance units can be arranged along either or both sides of the drum.

This automatic controller can be arranged to enable a lighting battery to be charged from the same generator or dynamo on for example a petrol electric vehicle, by means of the same oscillating armature. In this arrangement the resistance units for the automatic electric control of the vehicle transmission units are arranged in line on one side of the contact drum, and for lighting, resistance units may be similarly mounted on the opposite side of preferably the same drum, the units being connected in series with the charging current of the lighting battery.

In addition to the cut-out which is ordinarily in circuit of a dynamo charging a battery, the controller is arranged so that when approaching the position of rest, and the last finger making contact leaves the drum, this breaks the electric circuit.

A similar controller with segmental stepped contacts and oscillating armature may be arranged to be used in connection with petrol electric vehicles for controlling the electric current used for electric welding.

When the apparatus is adapted to automatically control the electric transmission, the armature is at its normal position of rest when the petrol electric vehicle is standing. As the speed of the prime mover is increased and the electric generator commences to excite, the armature tends to oscillate in the magnetic field decreasing the resistance in the generator field, and inserting a shunting resistance across the field of the electric motor.

As the speed of the motor vehicle varies, so the position of the electric controller armature varies in its movement of oscillation, thus varying the strength of the generator and the electric motor fields respectively.

In a previously proposed arrangement of automatic electric control the vibration of the vehicle tends to operate against the smooth working of the control. In the apparatus according to the present invention the movement and vibration of the vehicle tends to assist its satisfactory operation.

And in order that my invention may be completely understood reference should be made to the accompanying sheets of drawings which illustrate the preferred mode of carrying my invention into effect.

Fig. 1 is a plan of the general arrangement of the apparatus.

Fig. 2 is an elevation from the oscillating armature end from the left hand of Fig. 1.

Fig. 3 is an elevation from the other end or the right hand of Fig. 1.

Fig. 4 is a part section on the line Z Z of Fig. 1.

Figs. 5 and 6 are separate views of the contact sectors embedded in the drum.

Fig. 7 is a detail view of the drum spring.

Fig. 8 is a diagram of the arrangement of connections with the automatic controlling means embodied.

The armature A, see Figs. 2 and 3, is mounted upon a shaft or spindle in suitable bearings one at each end, as shown in the plan Fig. 1, in such manner that it may oscillate in the magnetic fields produced by the windings B, which windings are secured upon the ring C mounted on the base D. The armature A moves against the resistance of the coiled spring E, Figs. 1, 3 and 7. The spring E is secured at its outer end to the stud $E^1$ which is mounted on the adjusting lever arm $E^2$ by which the tension of the spring and its resistance to rotation may be varied at will. The inner end or coil of the spring E is secured to the spindle F. Upon the spindle F is concentrically mounted the drum G which is made of suitable insulating material. The cylindrical outer surface of the drum has recessed into it the bronze contact sectors H, O, by moulding or otherwise, and the contact and insulating surfaces are turned flush to a smooth finish. The carbon brushes J are of cylindrical form and are fitted as plungers within the small brass cylinders I each of which is formed with its standard or bracket $J^4$ which is mounted on the insulated base $D^1$. Each carbon plunger J has fitted behind it a small spring $J^2$ which serves to continuously press the carbon upon the face of the drum G.

As shown in the plan, Fig. 1, the carbon plungers J are arranged in their casings I in line on one side of the drum G and the carbon plungers $J^1$ are arranged in line on the opposite side of the drum G, see Figs. 1 and 4, and are of similar construction. The resistance units K are directly connected to the metallic brackets $J^4$ and are provided for the generator field. The resistance units L are provided for the diverting or shunting of the current in the motor series fields, and are similarly connected to metallic brackets $J^4$ carrying their respective carbon brushes J within the casings I. As shown in Fig. 1, there are ten resistance units for the generator field and three for the motor field. The carbon brushes J on this side of the drum thus connected are adapted to make contact with the two bronze contact sectors H and $H^1$ for the generator and motor fields respectively. The sector H is shown in section in Fig. 4, and the two sectors H and $H^1$ are shown in dotted lines in Fig. 1.

The described apparatus automatically controls the speed of the petrol electric vehicle and its operation is as follows:— When the drum G commences to make a movement of rotation and oscillation in the right hand direction as shown by the arrow in the elevation, Fig. 2, owing to the action before referred to of the armature A, the first step $H^2$ of the sector H is brought into contact with its corresponding carbon brush J and thus brings out of circuit its corresponding resistance unit K. A little further movement of the drum causes the next carbon brush to make contact with the next step of the sector H. The successive steps of the sector and the corresponding resistances K are thus successively brought into operation by the further rotative movement of the armature A, until the last step $H^3$ makes contact and thus all the resistances K are brought out of circuit. Still further movement of the drum brings the smaller sector $H^1$ into contact with its carbon brushes J by which the resistance units L are successively brought into operation for shunting or diverting the current in the motor series field. Movement of the drum in the opposite direction will cut in the resistances in succession or progressively according to the degree of movement of the armature. The return movement of the drum is effected by the spring E which cuts in the resistances successively and brings the drum back to rest when the generator has ceased to operate or excite.

The bronze sector O part of which is shown in full lines in Fig. 1, and as set out in plan in Fig. 6, is as shown in section in Fig. 4, arranged on the opposite side of the drum G and it operates to cut in or out the resistance units P which are placed on the opposite side (see Figs. 2 and 3) of the drum G. The resistance units P are placed in series with a circuit for charging an electric lighting battery indicated diagrammatically at Q, Fig. 1. The sector O is in one piece and is provided with steps $O^1$ to $O^{13}$. There are thirteen or more carbon plungers $J^1$ as shown in Fig. 1, and thirteen or more resistance units P arranged for the carbon brushes $J^1$, each carbon brush being in connection with its respective resistance unit. The first or end brush $J^{1x}$ placed opposite the step or rectangular gap $O^{14}$ on the sector only comes into action when the drum has made a certain angular movement of rotation and this obviates the use of the cut-out generally used in the electric lighting of vehicles.

When the generator is not excited and the drum is held in the inoperative position by the spring E the twelve carbon brushes $J^1$ are in contact with the sector O. The sector O is in the cut out position with relation to the brushes because the first carbon brush $J^{1x}$ is not in contact therewith owing to the gap or cut away part $O^{14}$. The resistances P are arranged in series. When the generator begins to excite and as before described the armature A begins to move or oscillate the drum, the sector O comes into contact in the step or gap $O^{14}$ and brings all the resistances out of operation through the carbon brush $J^{1x}$. As the drum is moved rotatively, the step $O^1$ on the sector is cut out and then with further movement of the drum, the next step is cut out and so on with each step in succession with further angular or rotative movement of the drum, until the whole sector O is out of contact with the carbon brushes $J^1$ when the last step $O^{13}$ leaves the contact brush or finger $J^{1x}$.

The resistances are thus operated to control automatically the current passing to the battery of storage cells Q for lighting the vehicle supplied from the generator, see the connections diagram, Fig. 8, in which T is the generator armature and $T^1$ the generator field. It will be seen that this is the same generator used for the transmission system of the vehicle.

This diagram, Fig. 8, shows the connections as used on the petrol electric chassis with the automatic electric controller previously described connected with the generator shunt field winding. The lead or wire is taken from its terminal R connecting to the resistances P, to one pole of the lighting battery Q shown diagrammatically also in Fig. 1, and from the opposite pole of the lighting battery back to the other terminal $T^2$ of the generator armature T; $T^1$ being the generator field. S is the motor armature and $S^1$ the motor field. This diagram shows the connections from the battery to the vehicle lighting system $Q^1$.

The diagram Fig. 8, also shows the connections with the sectors H and $H^1$ on the drum G rotatively oscillated by the oscillating armature A and the magnetic field B before described with the said resistances K, and the resistances L.

It will of course be understood that although the described method and rotary means provide automatic control of the transmission energy for propelling the vehicle, and this control is as shown arranged conveniently combined with the lighting charging control having one oscillating control apparatus actuated by one armature, in those vehicles in which electric lighting is not required the said drum is employed for the automatic control of the transmission energy without the electric lighting control.

To reverse the vehicle the reverse switch must be operated by hand.

What I do claim as my invention and desire to secure by Letters Patent is:—

1. In a vehicle having an electric transmission including generator field resistances and motor field diverting resistances, means for controlling the said resistances, said means comprising an armature mounted on a spindle and adapted to rotatively oscillate in a magnetic field energized from the transmission circuit and having mounted upon the same spindle means for cutting into and out of circuit progressively the said resistances.

2. In a vehicle having an electric transmission including generator field resistances and motor field diverting resistances, means for controlling the said resistances, said means comprising an armature mounted on a spindle and adapted to rotatively oscillate in a magnetic field energized from the transmission circuit, an insulated drum mounted upon the armature spindle, a conducting metallic segment embedded in the drum, and brushes adapted to make contact with the segment successively for cutting into and out of circuit the resistances.

3. In a vehicle having an electric transmission including generator field resistances and motor field diverting resistances, means for controlling the said resistances, said means comprising an armature mounted on a spindle and adapted to rotatively oscillate in a magnetic field energized from the transmission circuit, an insulated drum mounted upon the armature spindle, a conducting metallic segment embedded in the drum, a plurality of casings supported adjacent the drum, and spring pressed brushes operable in the casings and adapted to make contact with the segment successively for cutting in and out of circuit the resistances.

4. In a vehicle having an electric transmission including generator field resistances and motor field diverting resistances, means for controlling the said resistances, said means comprising an armature mounted on a spindle and adapted to rotatively oscillate in a magnetic field energized from the transmission circuit, an insulated drum mounted upon the armature spindle, a stepped conducting plate embedded in the drum, and brushes adapted to make contact with the steps of the conducting plate for successively cutting into and out of circuit the resistances.

5. In a vehicle having an electric transmission including generator field resistances and motor field diverting resistances, means for controlling the said resistances, said means comprising an armature mounted on a spindle and adapted to rotatively oscillate in a magnetic field energized from the transmission circuit, an insulated drum mounted upon the armature spindle, a conducting metallic segment embedded in the drum, brushes adapted to make contact with the segment successively for cutting into and out of circuit the resistances, and a spring for rotating the drum in one direction for bringing it to a position of rest.

6. In a vehicle having an electric transmission including generator field resistances and motor field diverting resistances, means for controlling the said resistances, said means comprising an armature mounted on a spindle and adapted to rotatively oscillate in a magnetic field energized from the transmission circuit, an insulated drum mounted upon the armature spindle, a conducting metallic segment embedded in the drum, brushes adapted to make contact with the segment successively for cutting into and out of circuit the resistances, a spring for rotating the drum in one direction for bringing it to a position of rest, and means for adjusting the tension of the spring.

7. In a vehicle having an electric transmission including generator field resistances and motor diverting resistances, means for controlling the said resistances, said means comprising an armature mounted on a spindle and adapted to rotatively oscillate in a magnetic field energized from the transmission circuit, an insulated drum mounted upon the armature spindle, an elongated metallic segment embedded in the drum and extending longitudinally thereof, said segment being of stepped formation, and a plurality of brushes arranged longitudinally of the drum and adapted to make contact with the steps of the segment successively for cutting in and out of circuit the resistances.

PHILLIP VICTOR POWELL.